(12) United States Patent
Bordogna et al.

(10) Patent No.: US 11,671,194 B2
(45) Date of Patent: Jun. 6, 2023

(54) TECHNOLOGIES FOR HIGH-PRECISION TIMESTAMPING OF PACKETS

(71) Applicant: Intel Corporation, Santa Clara, CA (US)

(72) Inventors: Mark A. Bordogna, Andover, MA (US); Janardhan H. Satyanarayana, Clinton, NJ (US); Larry N. Wakeman, Coopersburg, PA (US); Robert G. Southworth, Chatsworth, CA (US); Mika Nystroem, Pasadena, CA (US)

(73) Assignee: Intel Corporation, Santa Clara, CA (US)

(*) Notice: Subject to any disclaimer, the term of this patent is extended or adjusted under 35 U.S.C. 154(b) by 21 days.

(21) Appl. No.: 17/527,315

(22) Filed: Nov. 16, 2021

(65) Prior Publication Data

US 2022/0077946 A1    Mar. 10, 2022

Related U.S. Application Data

(63) Continuation of application No. 16/476,700, filed as application No. PCT/US2017/026504 on Apr. 7, 2017, now Pat. No. 11,212,024.

(51) Int. Cl.
*H04J 3/06*         (2006.01)
*H04L 43/0852*  (2022.01)

(52) U.S. Cl.
CPC ........ *H04J 3/0697* (2013.01); *H04L 43/0852* (2013.01)

(58) Field of Classification Search
CPC ............................ H04J 3/0697; H04L 43/0852
See application file for complete search history.

(56) References Cited

U.S. PATENT DOCUMENTS

| | | | |
|---|---|---|---|
| 6,198,752 B1 | 3/2001 | Lee | |
| 6,311,296 B1 | 10/2001 | Congdon | |
| 7,535,844 B1 | 5/2009 | Gulstone | |
| 9,210,488 B2 * | 12/2015 | Sun | ................... H04Q 11/0071 |

(Continued)

OTHER PUBLICATIONS

International Preliminary Reporton Patentability for PCT Patent Application No. PCT/US2017/026504, dated Oct. 8, 2019.

(Continued)

*Primary Examiner* — Chandrahas B Patel
(74) *Attorney, Agent, or Firm* — Essential Patents Group, LLP; Christopher K. Gagne

(57) ABSTRACT

Technologies for high-precision timestamping of data packets is disclosed. Several sources of errors that may arise when timestamping the arrival or sending of data packets may be determined and corrected, including variable latencies, semi-static latencies, and fixed latencies. In the illustrative embodiment, a variable latency may arise due to a phase difference between a clock of a network interface card and a system clock. When a trigger pattern is detected, such as the start of a data packet, a trigger may be sent from a circuit synchronized to the clock of the network interface card to a circuit synchronized to the system clock. The phase difference between the edge of the clock on the network interface card and the edge of the clock of the system clock leads to an error in the timestamp value. Determining the phase difference allows for the error in the timestamp value to be corrected.

16 Claims, 7 Drawing Sheets

(56) References Cited

U.S. PATENT DOCUMENTS

| | | |
|---|---|---|
| 9,547,332 B1 * | 1/2017 | Mizrahi ............... H04J 3/0697 |
| 9,564,913 B1 | 2/2017 | Courcy |
| 9,601,182 B2 | 3/2017 | Gans et al. |
| 9,906,358 B1 | 2/2018 | Tajalli |
| 10,191,797 B2 | 1/2019 | Lee |
| 10,764,027 B2 * | 9/2020 | Huang ............... H04L 43/0864 |
| 2004/0062278 A1 | 4/2004 | Hadzic et al. |
| 2008/0019398 A1 | 1/2008 | Genossar et al. |
| 2008/0144624 A1 | 6/2008 | Marcondes et al. |
| 2015/0055644 A1 | 2/2015 | Bordogna et al. |
| 2017/0041126 A1 | 2/2017 | Bergeron |

OTHER PUBLICATIONS

International Search Report and Written Opinion for PCT Patent Application No. PCT/US2017/026504, dated Oct. 25, 2017.
Notice of Allowance for U.S. Appl. No. 16/476,700, dated Aug. 23, 2021.
Office Action for U.S. Appl. No. 16/476,700, dated Apr. 6, 2021.
Aliaga, Ramon J., et al., "PET System Synchronization and Timing Resolution Using High-Speed Data Links", 2011 IEEE Transactions on Nuclear Science, vol. 58, Issue 4, pp. 1596-1605, May 28, 2010.

* cited by examiner

US 11,671,194 B2

TECHNOLOGIES FOR HIGH-PRECISION TIMESTAMPING OF PACKETS

BACKGROUND

Timestamping packets that are sent or received over a network is important for several applications. Determination of a time of sending and arrival of a packet may be used to synchronize a time of day counter between the sending and receiving compute devices, which may be necessary for time-sensitive applications such as certain wireless communication protocols.

A timestamp of when a packet is sent or received may have several sources of inaccuracy. For example, a packet may be scrambled, requiring descrambling before a pattern can be recognized for timestamping, or the packet may be transferred between domains with asynchronous clocks as compared to the clock used for timestamping, both of which may contribute to the inaccuracy in timestamping when a packet actually arrives at a device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
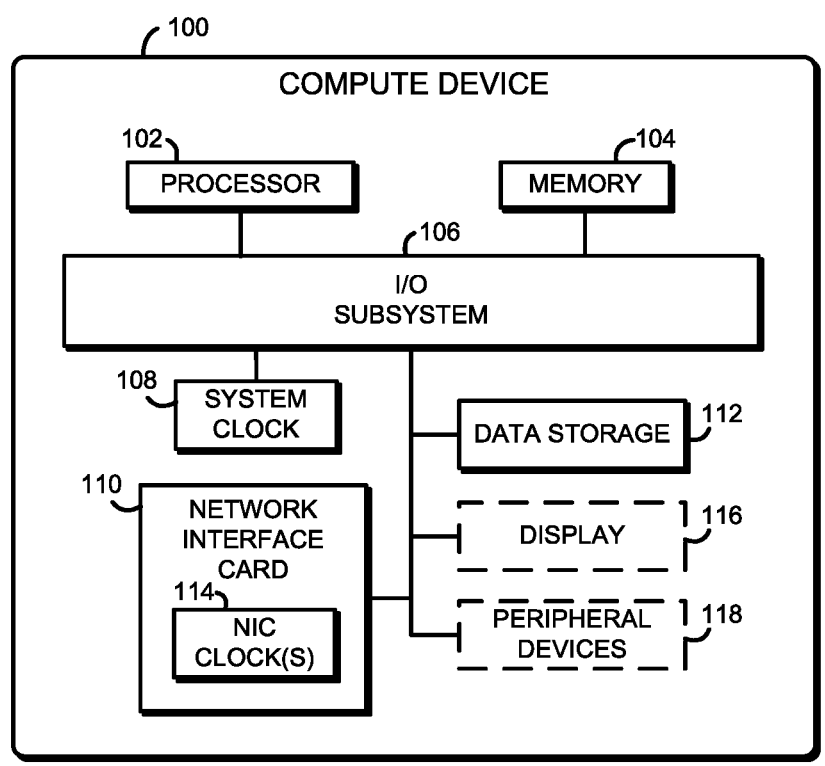
FIG. 1 is a simplified block diagram of at least one embodiment of a compute device for timestamping data packets.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 is configured to perform high-precision timestamping of data packets that are either sent or received by a network interface card 110 of the compute device 100. In use, when data is received by the network interface card 110 from another compute device over a network, the network interface card 110 performs several steps as part of processing the data. For example, in an illustrative embodiment, the data is received serially at a physical interface of the network interface card 110 to a physical medium and deserialized into a parallel bit stream of, e.g., 40 or 16 bits. The parallel bit stream is then changed through a gearbox to a width of 66 bits. Each set of 66 bits is descrambled using a 64b/66b line coding to 64 bits. After descrambling, the data may be analyzed, such as by checking for the presence of a trigger pattern (e.g., a pattern indicating the start of a data packet). If the trigger pattern is present, the network interface card 110 triggers a timestamp to a hardware component of the compute device 100 synchronized with the system clock 108. However, there may be several sources of error that lead to an imprecise value of the timestamp. The clock used to synchronize the network interface card 110 to the incoming data stream may not be synchronized to the system clock 108, leading to an error based on a phase difference between the transition edges of the two clocks. Additionally, each side of the gearbox has a clock running at a rate that is inversely proportional to the width of the corresponding parallel bit stream. The difference between the frequencies and phase of those two clocks may also lead to a timing error. To compensate for the possible timing errors, the illustrative compute device 100 may determine the latencies of the network interface card 110 and correct the errors in the final value of the timestamp. For example, the compute device 100 may determine the phase difference between the system clock 108 of the compute device 100 and a network interface card clock 114 of the network interface card 110 so that a timestamp value corresponding to a particular clock cycle of the system clock 108 can be correlated to a particular clock cycle of the network interface card clock 114.

The compute device 100 may be embodied as any type of compute device capable of managing data packets and performing the functions described herein. For example, the compute device 100 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. In some embodiments, the compute device 100 may be embodied as an Internet-of-Things device and form, potentially with other devices, a mesh network, which may operate at the edge of a cloud network, as described below in more detail in regard to FIG. 7. The illustrative compute device 100 includes the processor 102, a memory 104, an input/output (I/O) subsystem 106, a system clock 108, a network interface card 110, and data storage 112. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The system clock 108 may be embodied as any type of device, circuit, and/or collection of devices or circuits capable of generating a clock signal usable by other components of the compute device 100. For example, the system clock 108 may be embodied as, or otherwise include, a crystal oscillator-based circuit. The clock signal may be used by various components of the compute device 100 to synchronize timing of communication. For example, the processor 102 and the memory 104 may each be synchronized to the system clock 108. The clock signal may be any type of clock signal, such as a square wave or a sine wave. The frequency of the clock signal generated by the system clock 108 may be any suitable frequency, such as 100, 200, or 500 megahertz (MHz).

The network interface card 110 may be embodied as any type of interface capable of interfacing the compute device 100 with other compute devices, such as over a network. In some embodiments, the network interface card 110 may be referred to as a host fabric interface (HFI). The network interface card 110 may be capable of interfacing with any appropriate cable type, such as an electrical cable or an optical cable, and/or may be capable of interfacing with a wireless signal, such as through one or more antennae. The network interface card 110 may be configured to use any one or more communication technology and associated protocols (e.g., Ethernet, Bluetooth®, Wi-Fi®, WiMAX, near field communication (NFC), etc.). The network interface card 110 may be located on silicon separate from the processor 102, or the network interface card 110 may be included in a multi-chip package with the processor 102, or even on the same die as the processor 102. The network interface card 110 may be embodied as one or more add-in-boards, daughtercards, network interface cards, controller chips, chipsets, specialized components such as a field programmable gate array (FPGA) or application specific integrated circuit (ASIC), or other devices that may be used by the compute device 100 to connect with another compute device. In some embodiments, network interface card 110 may be embodied as part of a system-on-a-chip (SoC) that includes one or more processors, or included on a multichip package that also contains one or more processors. In some embodiments, the network interface card 110 may include a local processor (not shown) and/or a local memory (not shown) that are both local to the network interface card 110. In such embodiments, the local processor of the network interface card 110 may be capable of performing one or more of the functions of the processor 102 described herein. Additionally or alternatively, in such embodiments, the local memory of the network interface card 110 may be integrated into one or more components of the compute device 100 at the board level, socket level, chip level, and/or other levels.

The illustrative network interface card 110 includes one or more network interface card clocks (NIC clocks) 114. In the illustrative embodiment, one of the NIC clocks 114 is used for transmitting a signal to another compute device. The NIC clock 114 used for transmission may be similar to the system clock 108, the description of which will not be repeated in the interest of clarity. In the illustrative embodiment, another one of the NIC clocks 114 is used for receiving a signal from another compute device. The NIC clock 114 used for receiving may operate in a different manner from the system clock 108, such as by recovering a clock from the signal received by the network interface card 110. It should be appreciated that the NIC clocks 114 may operate at a different frequency than the system clock 108, and the NIC clocks 114 and the system clock 108 may be free-running (i.e., operate independently of each other with no fixed timing relationship between them). It should further be appreciated that different components of the network interface card 110 may operate on different clocks, including the NIC clock(s) 114 and the system clock 108.

The data storage 112 may be embodied as any type of device or devices configured for the short-term or long-term storage of data. For example, the data storage 112 may include any one or more memory devices and circuits, memory cards, hard disk drives, solid-state drives, or other data storage devices.

In some embodiments, the compute device 100 may include other or additional components, such as those commonly found in a compute device. For example, the compute device 100 may also have a display 116 and/or peripheral devices 118. The peripheral devices 118 may include a keyboard, a mouse, etc. The display 116 may be embodied as any type of display on which information may be displayed to a user of the compute device 100, such as a touchscreen display, a liquid crystal display (LCD), a light emitting diode (LED) display, a cathode ray tube (CRT) display, a plasma display, an image projector (e.g., 2D or 3D), a laser projector, a heads-up display, and/or other display technology.

Figure 2:
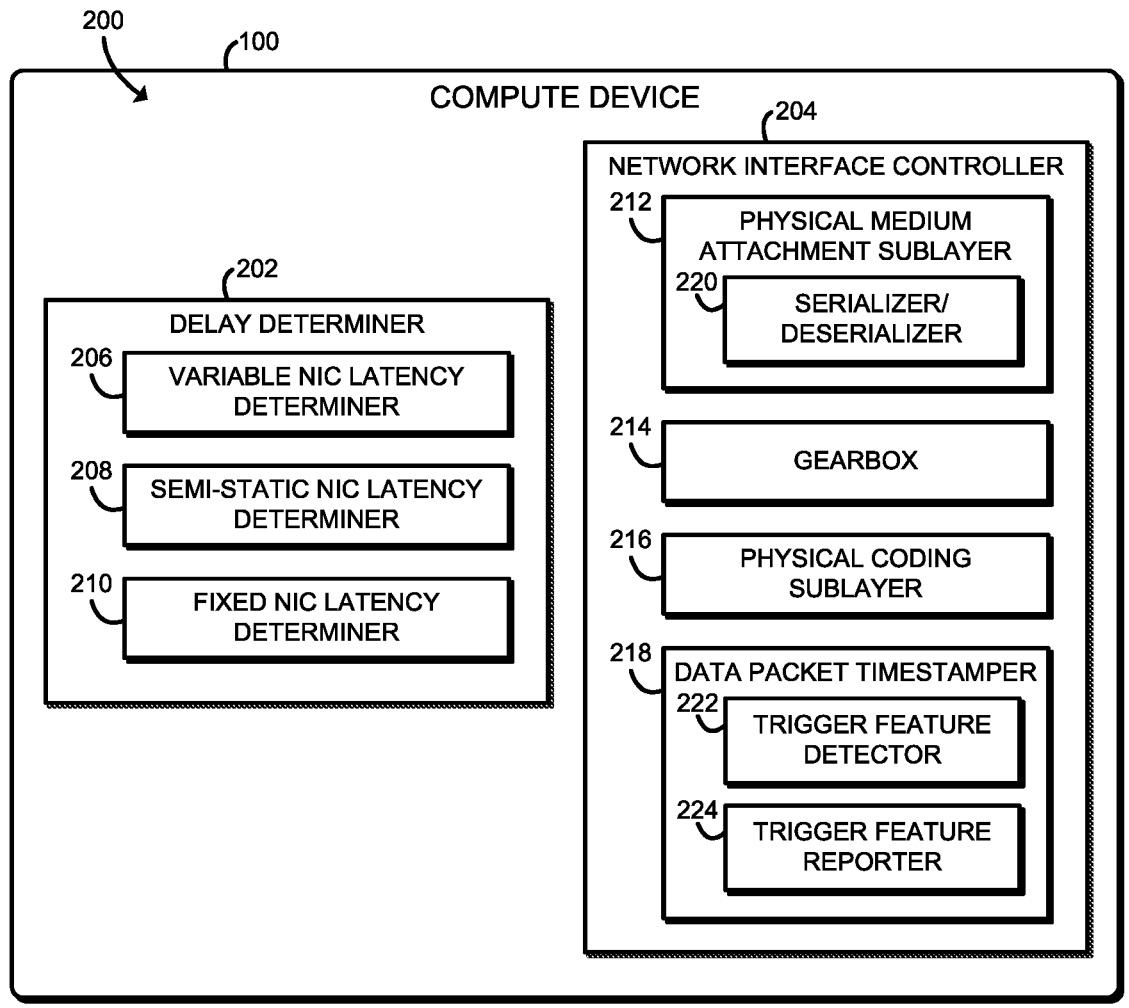
FIG. 2 is a block diagram of at least one embodiment of an environment that may be established by the compute device of FIG. 1.

Referring now to FIG. 2, in an illustrative embodiment, the compute device 100 establishes an environment 200 during operation. The illustrative environment 200 includes a delay determiner 202 and a network interface controller 204. The various modules of the environment 200 may be embodied as hardware, software, firmware, or a combination thereof. For example, the various modules, logic, and other components of the environment 200 may form a portion of, or otherwise be established by, the processor 102 or other hardware components of the compute device 100 such as the network interface card 110. As such, in some embodiments, one or more of the modules of the environment 200 may be embodied as circuitry or collection of electrical devices (e.g., a delay determiner circuit 202, a network interface controller circuit 204, etc.). It should be appreciated that, in such embodiments, one or more of the circuits (e.g., the delay determiner circuit 202, the network interface controller circuit 204, etc.) may form a portion of one or more of the processor 102, the memory 104, the I/O subsystem 106, the data storage 112, and/or other components of the compute device 100. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 100. It should be appreciated that some of the functionality of one or more of the modules of the environment 200 may require a hardware implementation, in which case embodiments of modules which implement such functionality will be embodied at least partially as hardware.

The delay determiner 202, which may be embodied as hardware, firmware, software, virtualized hardware, emulated architecture, and/or a combination thereof as discussed above, is configured to determine the various delays that may occur between when a packet or frame is received at the network interface card 110 and when a timestamp is triggered based on a detection of a particular trigger pattern, such as a start of frame delimiter. The delay determiner 202 includes a variable network interface card (NIC) latency determiner 206, a semi-static NIC latency determiner 208, and a fixed NIC latency determiner 210. The variable NIC latency determiner 206 is configured to determine a latency that may vary over time. In the illustrative embodiment, the variable NIC latency determiner 206 determines a variable latency that occurs due to a phase difference between the system clock 108 and a NIC clock 114. As discussed in more detail below in regard to FIG. 6, when the network interface card 110 triggers a timestamp, the trigger is sent from a circuit synchronized to a NIC clock 114, but is received and timestamped based on a circuit synchronized to the system clock 108. Since the system clock 108 and the NIC clock 114 are not locked to each other, there is not a definite relationship between the phases of the two clocks. The variable NIC latency determiner 206 is configured to determine the phase difference of one or more of the NIC clocks 114 relative to the system clock 108. The variable NIC latency determiner 206 may determine the phase difference in any suitable manner. In the illustrative embodiment, each of the NIC clock 114 and the system clock 108 have an associated time counter which is configured to provide an indication of the current time. Since a time counter is updated each clock cycle, the time counter has an error of a fraction of a clock cycle of the corresponding clock at any given time, and the error is minimized immediately after the time counter is updated, which occurs at an edge of the corresponding clock signal. The variable NIC latency determiner 206 may determine a phase difference between the NIC clock 114 and the system clock 108 by monitoring the difference between the time counter corresponding to the NIC clock 114 and the time counter corresponding to the system clock 108. When the difference between the time counters is at a minimum (i.e., near zero), then the variable NIC latency determiner 206 may determine that the relative phase between the edges of the corresponding clock signals is near zero. The variable NIC latency determiner 206 may extrapolate the current phase difference between the corresponding clock signals based on the known frequencies of the two clock signals. It should be appreciated that the approach described herein is only one possible implementation, and that other approaches for estimating the phase between two clock signals may be used, which may or may not depend on determining the difference between two time counters.

In some embodiments, the variable NIC latency determiner 206 may additionally or alternatively determine variable latencies different from the variable latency caused by the lack of synchronization between a NIC clock 114 and the system clock 108. For example, in some embodiments, the network interface card 110 may transfer a signal between domains on the network interface card 110 which operate based on two independent NIC clocks 114, and the variable latency between those two NIC clocks 114 may be determined in a similar manner as the variable latency between a NIC clock 114 and the system clock 108. One example of such an embodiment would be when the network interface card 110 has components which implement additional processing of a signal, such as including forward error correction.

The semi-static NIC latency determiner 208 is configured to determine NIC latencies which are semi-static. A semi-static latency is one which may assume different values when certain events occur, such as when a device is first powered on, but which does not change its value otherwise. In the illustrative embodiment, when the network interface card 110 is first powered on, the network interface card 110 begins sampling the physical medium to which is it connected, such as a wire or an antenna. As described in more detail below in regard to FIG. 6, the sampled bits are deserialized to a bus of a first width, which is then transferred through a gearbox to a bus of a second width. Since the start of a frame or packet may occur at any time, the first bit of a frame or packet may occur at any position in the bus of the second width. Each bit of any given cycle of the bus is received on the bus at the same time, but each bit may be received at a different time at the physical medium. Once the position is determined, it remains the same as long as the network interface card 110 continues sampling the physical medium at a rate synchronized with an incoming signal. The semi-static NIC latency determiner 208 is configured to determine the latency based on the position of the trigger pattern (such as a start of frame delimiter) in the bus. In some embodiments, the semi-static NIC latency determiner 208 may determine the semi-static latency by determining a phase difference between a clock associated with the bus of the first width and a clock associated with the bus of the second width.

The fixed NIC latency determiner 210 is configured to determine a fixed latency of the NIC. The fixed latency may arise from several different sources, such as propagation time of a signal through a circuit, a number of clock cycles required for a certain step of processing a signal, etc. The fixed NIC latency determiner 210 may determine the fixed latency by any suitable means, including reading a fixed latency value stored on the compute device 100, which may have been determined at a previous time, such as at or before a time of manufacturing of the network interface card 110.

It should be appreciated that each of the variable NIC latency determiner 206, the semi-static NIC latency determiner 208, and the fixed NIC latency determiner 210 of the delay determiner 202 may be separately embodied as hardware, firmware, software, virtualized hardware, emulated architecture, and/or a combination thereof. For example, the variable NIC latency determiner 206 may be embodied as a hardware component, while the semi-static NIC latency determiner 208 is embodied as a virtualized hardware component or as some other combination of hardware, firmware, software, virtualized hardware, emulated architecture, and/or a combination thereof.

The network interface controller 204, which may be embodied as hardware, firmware, software, virtualized hardware, emulated architecture, and/or a combination thereof as discussed above, is configured to control the network interface card 110, including the interaction of the network interface card 110 with the physical medium to which it is attached and the processing of incoming and outgoing signals which the network interface card 110 receives and sends. The network interface controller 204 includes a physical medium attachment sublayer 212, a gearbox 214, a physical coding sublayer 216, and a data packet timestamper 218.

The physical medium attachment sublayer 212 is configured to sample an incoming signal at the physical medium to which it is attached and provide a signal usable for other components of the network interface card 110, such as a serial electrical signal at standardized voltage levels. The physical medium attachment sublayer 212 is also configured to send outgoing signals received from other components of the network interface card 110 to the physical medium to which it is attached. In the illustrative embodiment, the physical medium attachment sublayer 212 synchronizes a NIC clock 114 to the incoming signal, which is used by the physical medium attachment sublayer 212 and other components of the network interface card 110 for processing the incoming signal. The illustrative physical medium attachment sublayer 212 also uses a NIC clock 114 that is free-running relative to other clocks for sending a signal over the physical medium and for processing the signal before it is sent over the physical medium.

The physical medium attachment includes a serializer/deserializer (SerDes) 220. The SerDes 220 is configured to transfer a serial signal to a parallel signal and to transfer a parallel signal to a serial signal. In the illustrative embodiment, the physical medium is sampled or driven serially, and the SerDes 220 deserializes incoming signals from the physical medium to a bus for use by the physical medium attachment sublayer 212 and serializes signals from the physical medium attachment sublayer 212 to be sent on the physical medium. The SerDes 220 may transfer between a serial interface and parallel interface of any suitable bus size, such as 16 or 40 bits. In some embodiments, the signal physical medium may not be sent out as a single serial signal, but may be sent out as a parallel signal or as several separate serial signals.

The gearbox 214 is configured to transfer a parallel bus of a first width to/from the physical medium attachment sublayer 212 to a parallel bus of a second width from/to the physical coding sublayer 216. In the illustrative embodiment, the physical medium attachment sublayer 212 is 40 bits wide, and the physical coding sublayer is 66 bits wide, but other widths may be used in other embodiments. In the illustrative embodiment, the clock associated with each of the buses of the physical medium attachment sublayer 212 and the physical coding sublayer 216 is derived from a bus associated with a rate data is being sent or received on the physical medium. As such, the clock associated with the bus of the physical medium attachment sublayer 212 has a definite relationship with the clock of the physical coding sublayer 216, although the two clocks are out of phase and running at different frequencies. For example, in the illustrative embodiment, the clock associated with the physical medium operates at 10.3125 gigahertz (GHz), the clock associated with the bus of the physical medium attachment sublayer 212 operates at 10.3125 GHz/40=257.8125 megahertz (MHz), and the clock associated with the bus of the physical coding sublayer 216 operates at 10.3125 GHz/66=156.25 MHz. Since the clocks operating at 257.8125 MHz and 156.25 MHz are both derived from the clock operating at 10.3125 GHz, the two clocks operating at 257.8125 MHz and 156.25 MHz are locked relative to one another but may be out of phase.

The physical coding sublayer 216 is configured to perform coding on the incoming and outgoing signals. In the illustrative embodiment, the physical coding sublayer 216 performs a 64b/66b encoding to decode 66 bits to 64 bits or to encode 64 bits to 66 bits using the 64b/66b encoding algorithm described in IEEE Std 802.3-2015, approved Sep. 3, 2015, by the IEEE-SA Standards Board. In other embodiments, the physical coding sublayer 216 may perform additional or alternative encoding, such as 4b/5b encoding, 8b/10b encoding, or forward error correction encoding. It should be appreciated that, in the illustrative embodiment, the incoming signal may not be able to be processed until after the physical coding sublayer 216 decodes the signal. For example, the trigger pattern that is being detected as a trigger for timestamping may only be able to be detected after decoding is complete.

The data packet timestamper 218 is configured to trigger a timestamp when a data packet is being sent or received. The data packet timestamper 218 includes a data packet detector 222 and a data packet reporter 224. The data packet detector 222 is configured to detect a particular trigger patterns such as the start of a data packet in the received signal and send a corresponding trigger to the data packet timestamper 218, and the data packet reporter 224 is configured to report the presence of a particular trigger pattern such as the start of a data packet that is being sent out by sending a corresponding trigger to the data packet timestamper 218. Each of the data packet detector 222 and the data packet reporter 224 is configured to send the trigger at a fixed time relative to the detection of the relevant trigger pattern so that no variable latency is introduced by the data packet detector 222 or the data packet reporter 224. As described below in more detail in regard to FIG. 6, it should be appreciated that the data packet detector 222 may operate synchronized to a first NIC clock 114, the data packet reporter 224 may operate synchronized to a second NIC clock 114 different from the first, and the rest of the data packet timestamper 218 may operate synchronized to the system clock 108. In the illustrative embodiment, the trigger pattern that the data packet detector 222 and the data packet reporter 224 are configured to trigger on is a start of frame delimiter in an Ethernet frame corresponding to the start of an internet protocol (IP) packet. In other embodiments, the data packet detector 222 and/or the data packet reporter 224 may be configured to trigger on different trigger patterns, such as a start of a packet or frame from various other protocols, the end of a packet or frame of various protocols, etc.

Figure 3:
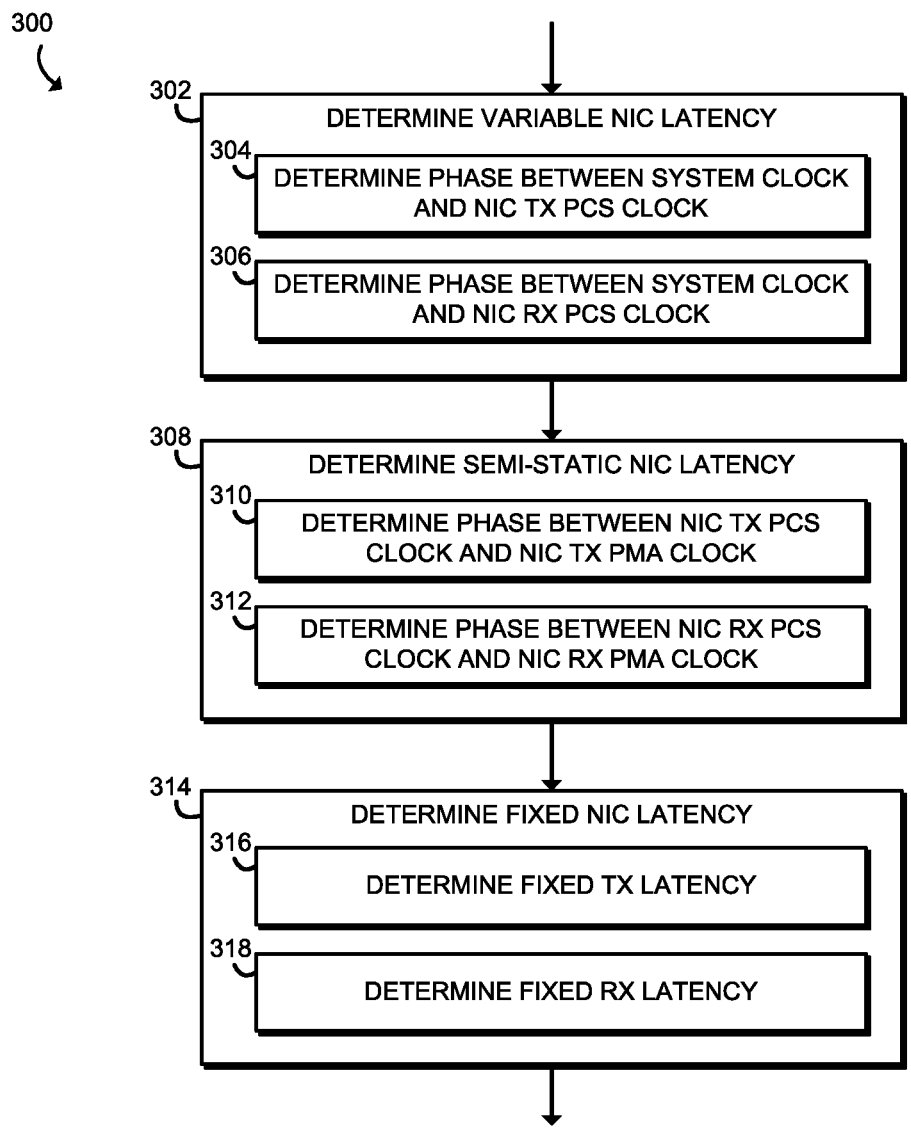
FIG. 3 is a simplified flow diagram of at least one embodiment of a method for determining latencies of a network interface card of the compute device of FIG. 1.

Referring now to FIG. 3, in use, the compute device 100 may execute a method 300 for determining latencies of the network interface card 110. The method begins in block 302, in which the compute device 100 determines one or more variable NIC latencies, such as a variable latency that occurs due to a phase difference between the system clock 108 and a NIC clock 114. Since the system clock 108 and the NIC clock 114 are not locked to each other, there is not a definite relationship between the phases of the two clocks. The compute device 100 in block 302 determines the phase difference of one or more of the NIC clocks 114 relative to the system clock 108. In the illustrative embodiment, each of the NIC clock 114 and the system clock 108 have an associated time counter which is configured to provide an indication of the current time. Since a time counter is updated each clock cycle, the time counter has an error of a fraction of a clock cycle of the corresponding clock at any given time, and the error is minimized immediately after the time counter is updated, which occurs at an edge of the corresponding clock signal. The compute device 100 determines a phase difference between the NIC clock 114 and the system clock 108 by monitoring the difference between the time counter corresponding to the NIC clock 114 and the time counter corresponding to the system clock 108. When the difference between the time counters is at a minimum (i.e., near zero), then the compute device 100 determines that the relative phase between the edges of the corresponding clock signals is near zero. The compute device 100 may extrapolate the phase difference at earlier or later times between the corresponding clock signals based on the known frequencies of the two clock signals. It should be appreciated that the approach described herein is only one possible implementation, and that the compute device 100 may implement other approaches for estimating the phase between two clock signals, which may or may not depend on determining the difference between two time counters.

In block 304, the compute device 100 determines the phase between the system clock 108 and a NIC transmission (TX) physical coding sublayer (PCS) clock, which is used to synchronize the various components of the physical coding sublayer 216 involved with sending a signal over the physical medium. In block 306, the compute device 100 determines the phase between the system clock 108 and a NIC receiving (RX) physical coding sublayer (PCS) clock, which is used to synchronize the various components of the physical coding sublayer 216 involved with receiving a signal over the physical medium.

In some embodiments, the compute device 100 may additionally or alternatively determine variable latencies different from the variable latency caused by the lack of synchronization between a NIC clock 114 and the system clock 108. For example, in some embodiments, the network interface card 110 may transfer a signal between domains on the network interface card 110 which operate based on two independent NIC clocks 114, and the compute device 100 may determine a variable latency between those two NIC clocks 114 in a similar manner as the variable latency between a NIC clock 114 and the system clock 108.

In block 308, the compute device 100 determines one or more semi-static NIC latencies. As described above in more detail, in the illustrative embodiment, a trigger pattern that is used as a trigger for a timestamp may appear at any position in a bus of the physical coding sublayer 216, which is determined when the network interface controller 204 first synchronizes with the incoming signal from the physical medium. Once the position is determined, it does not change as long as synchronization is maintained with the incoming signal, and the latency due to the variable position is called a semi-static latency. The compute device 100 in block 308 determines the semi-static latency based on the position of the relevant trigger pattern in the bus.

In some embodiments, the compute device 100 may determine the semi-static latency by determining a phase difference between a clock associated with the physical coding sublayer 216 and a clock associated with the physical medium attachment sublayer 212. In block 310, the compute device 100 determines the phase between a NIC transmission (TX) physical coding sublayer (PCS) clock and a NIC TX physical medium attachment sublayer (PMA) clock. The NIC TX PCS clock is used to synchronize the various components of the physical coding sublayer 216 involved with sending a signal over the physical medium, and the NIC TX PMA clock is used to synchronize the various components of the physical medium attachment sublayer 212 involved with sending a signal over the physical medium. In block 312, the compute device 100 determines the phase between a NIC receiving (RX) PCS clock and a NIC RX PMA clock. The NIC RX PCS clock is used to synchronize the various components of the physical coding sublayer 216 involved with receiving a signal over the physical medium, and the NIC RX PMA clock is used to synchronize the various components of the physical medium attachment sublayer 212 involved with receiving a signal over the physical medium.

In block 314, the compute device 100 determines one or more fixed NIC latencies. The compute device 100 may determine the fixed latency by any suitable means, including reading a fixed latency value stored on the data storage 112, which may have been determined at a previous time, such as at or before a time of manufacturing of the network interface card 110. The compute device 100 determines a fixed transmission (TX) latency in block 316, and the compute device 100 determines a fixed receiving (RX) latency in block 318.

Figure 4:
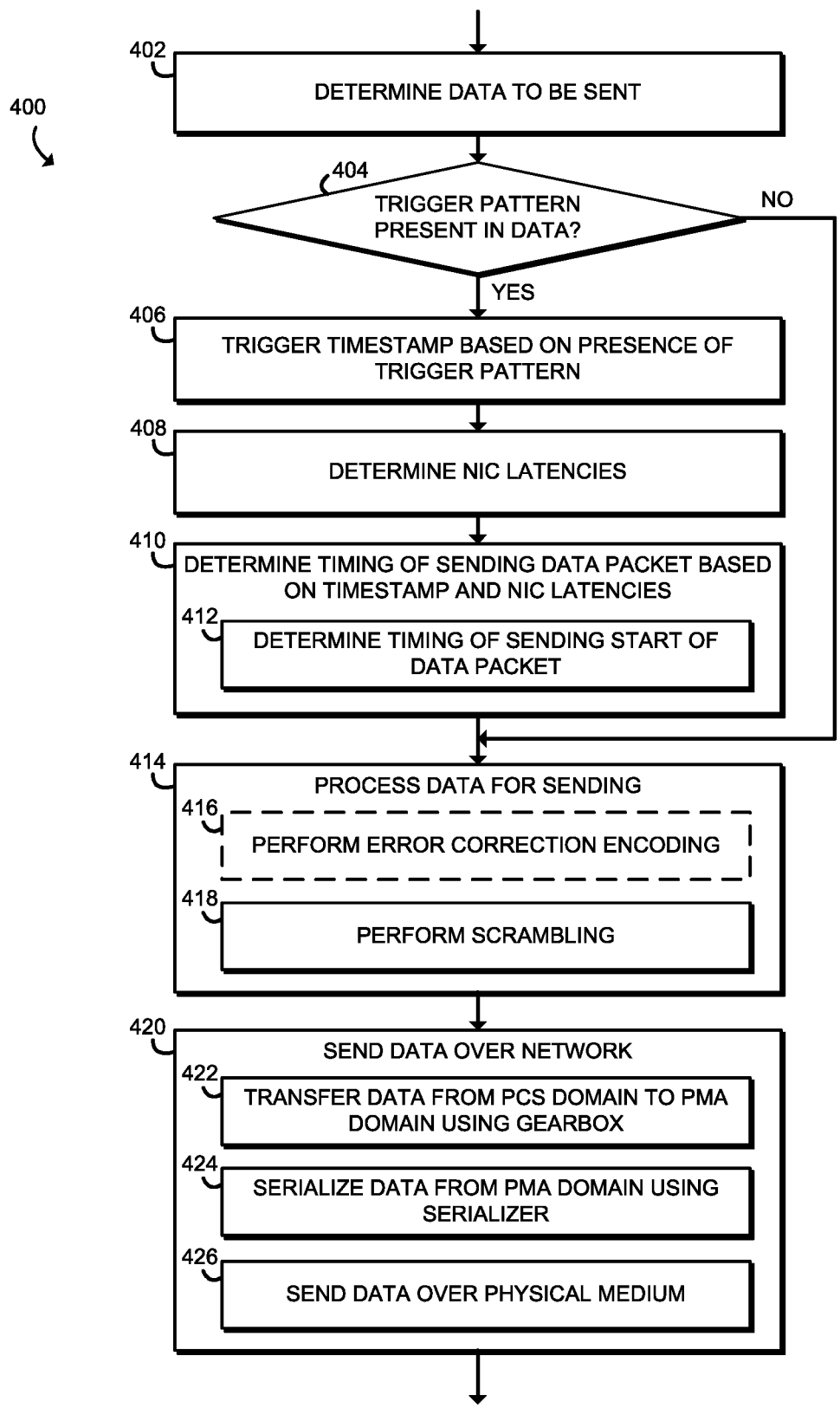
FIG. 4 is a simplified flow diagram of at least one embodiment of a method for timestamping the sending of a data packet that may be executed by the compute device of FIG. 1.

Referring now to FIG. 4, in use, the compute device 100 may execute a method 400 for timestamping data that is to be sent by the network interface card 110. The method 400 begins in block 402, in which the compute device 100 determines data to be sent on the physical medium to which the network interface card 110 is connected. For example, an application being executed by the processor 102 may generate data that is to be sent to a remote compute device using the network interface card 110.

In block 404, if a particular trigger pattern which is to be reported is present in the data, the method 400 proceeds to block 406, in which the compute device 100 triggers a timestamp based on the presence of the trigger pattern. The trigger pattern to be reported may be any suitable trigger pattern used for timestamping the sending of data, such as a start of frame delimiter in an Ethernet frame corresponding to the start of an IP packet, a start of a packet or frame from various other protocols, the end of a packet or frame of various protocols, etc. In the illustrative embodiment, the compute device 100 triggers a timestamp from a circuit synchronized to a NIC clock 114 to a circuit synchronized to the system clock 108, which records a value of a time counter associated with the system clock 108.

In block 408, the compute device 100 determines the network interface card 110 latencies, such as by executing the method 300 described above or by accessing one or more parameters stored in the compute device 100 based on a previous execution of the method 300. The compute device 100 may determine a variable latency, a semi-static latency, and/or a fixed latency.

In block 410, the compute device 100 determines a timing of sending the detected trigger pattern based on the timestamp value and the latencies of the network interface card 110. In the illustrative embodiment, the trigger pattern corresponds to the start of a data packet, and the compute device 100 determines the timing of sending the data packet based on the timestamp value and at least the variable latency of the phase between the system clock 108 and a NIC clock 114 in block 412. It should be appreciated that, in some embodiments, the compute device 100 may determine the timing of the sending of the trigger pattern before or after the trigger pattern is actually sent, since the latencies associated with the sending are known and do not change as part of the process of sending the data.

Referring back to block 404, if the particular trigger pattern which is to be reported is not present in the data, the method 500 proceeds to block 414, in which the compute device 100 processes the data in preparation for sending the data on the physical medium. In block 416, in some embodiments, the compute device 100 performs forward error correction encoding. In block 418, the compute device 100 performs scrambling, such as by implementing the 64b/66b encoding algorithm described in IEEE Std 802.3-2015, approved Sep. 3, 2015, by the IEEE-SA Standards Board. In some embodiments, the compute device 100 may perform additional or alternative encoding, such as 4b/5b encoding or 8b/10b encoding.

In block 420, the compute device 100 sends the data over the network. To do so, in the illustrative embodiment, the compute device 100 transfers the data from the physical coding sublayer (PCS) domain associated with a PCS clock to a physical medium attachment sublayer (PMA) domain associated with a PMA clock using a gearbox 214. In the illustrative embodiment, in the PCS domain, a bus width of 66 bits is used, and in the PMA domain, a bus width of 40 bits is used. The gearbox 214 converts from a bus width of 66 bits to a bus width of 40 bits. In block 424, the compute device 100 serializes the data from the bus of the PMA domain using a serializer, which may be part of the serializer/deserializer 220. In block 426, the compute device 100 then sends the data over the physical medium, such as a wire or an antenna.

Figure 5:
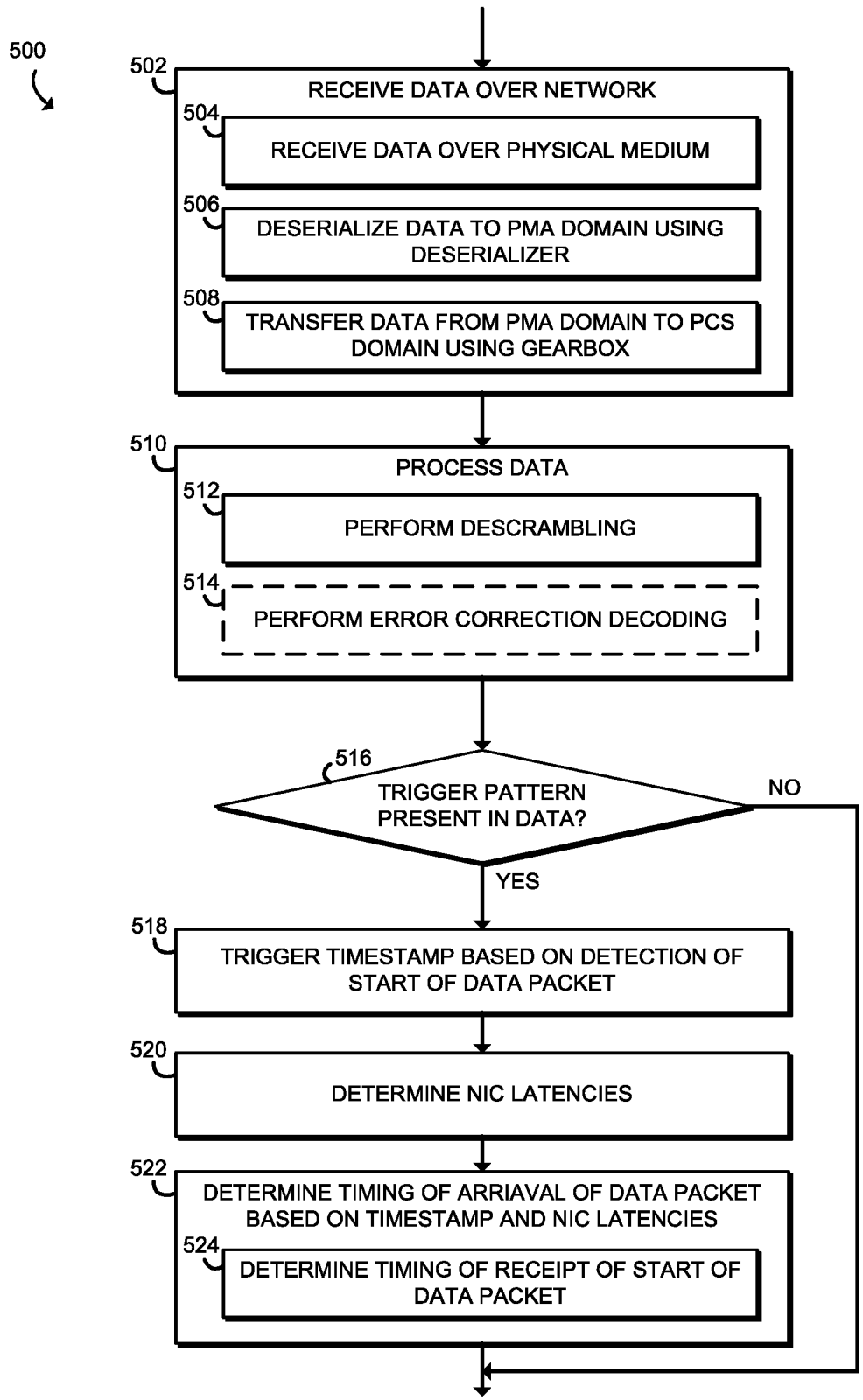
FIG. 5 is a simplified flow diagram of at least one embodiment of a method for timestamping the receiving of a data packet that may be executed by the compute device of FIG. 1.

Referring now to FIG. 5, in use, the compute device 100 may execute a method 400 for timestamping data that is received by the network interface card 110. The method 500 begins in block 502, in which the compute device 100 receives data over a network. To do so, in the illustrative embodiment, the compute device 100 receives the data over the physical medium, such as a wire or an antenna, in block 504. In block 506, the compute device 100 deserializes the data to the bus of the physical medium attachment (PMA) domain using a deserializer, which may be part of the serializer/deserializer 220. In block 508, the compute device 100 transfers the data from the PMA domain associated with a PMA clock to a physical coding sublayer (PCS) domain associated with a PCS clock using a gearbox 214. In the illustrative embodiment, in the PCS domain, a bus width of 66 bits is used, and in the PMA domain, a bus width of 40 bits is used. The gearbox 214 converts from a bus width of 40 bits to a bus width of 66 bits.

In box 510, the compute device 100 processes the data. In block 512, the compute device 100 performs descrambling, such as by implementing the 64b/66b decoding algorithm described in IEEE Std 802.3-2015, approved Sep. 3, 2015, by the IEEE-SA Standards Board. In some embodiments, the compute device 100 may perform additional or alternative decoding, such as 4b/5b decoding or 8b/10b decoding. In block 514, in some embodiments, the compute device 100 performs forward error correction decoding.

In block 516, if a particular trigger pattern is present in the data, the method 500 proceeds to block 518, in which the compute device 100 triggers a timestamp based on the presence of the trigger pattern. The trigger pattern may be any suitable trigger pattern used for timestamping the sending of data, such as a start of frame delimiter in an Ethernet frame corresponding to the start of an IP packet, a start of a packet or frame from various other protocols, the end of a packet or frame of various protocols, etc. In the illustrative embodiment, the compute device 100 triggers a timestamp from a circuit synchronized to a NIC clock 114 to a circuit synchronized to the system clock 108, which records a value of a time counter associated with the system clock 108.

In block 520, the compute device 100 determines the network interface card 110 latencies, such as by executing the method 300 described above or by accessing one or more parameters stored in the compute device 100 based on a previous execution of the method 300. The compute device 100 may determine a variable latency, a semi-static latency, and/or a fixed latency.

In block 522, the compute device 100 determines a time of arrival of the detected trigger pattern based on the timestamp value and the latencies of the network interface card 110. In the illustrative embodiment, the trigger pattern corresponds to a start of a data packet, and the compute device 100 determines the time of arrival of the data packet based on the timestamp value and at least the variable latency of the phase between the system clock 108 and a NIC clock 114 in block 524.

Referring back to block 516, if the trigger pattern is not present in the data, the method 500 proceeds past block 522 to the end of the method 500. Of course, the compute device 100 may take additional action after block 522, such as by forwarding the data received to a particular application of the compute device 100.

Figure 6:
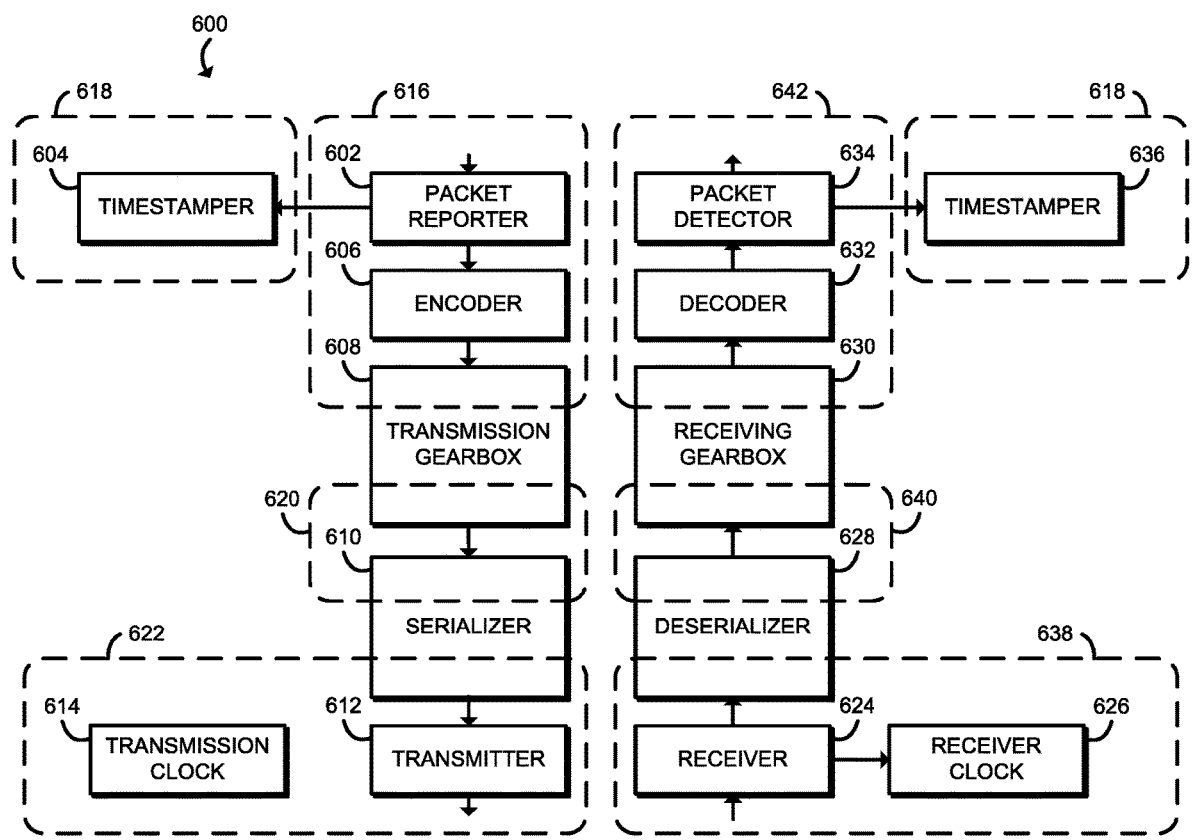
FIG. 6 is a simplified diagram of at least one embodiment of data flow in a network interface card of the compute device of FIG. 1.

Referring now to FIG. 6, in use, an illustrative data flow 600 of data in the network interface card 110 is shown. When transmitting data, data is checked by a packet reporter 602 for a trigger pattern, such as a start of frame delimiter. If the trigger pattern is found, a timestamper 604 is triggered.

The data then passes to an encoder 606, which may encode data by scrambling it and/or applying other encoding such as forward error correction. The data is then transferred from a first bus to a second bus using a transmission gearbox 608. After the transmission gearbox 608, the data is serialized by a serializer 610, and is finally transmitted with a transmitter 612 over a physical medium.

The various elements used in transmitting the data are synchronized based on a transmission clock 614. However, the various components are associated with different clock domains. The packet reporter 602, encoder 606, and a portion of the transmission gearbox 608 are associated with a transmission (TX) physical coding sublayer (PCS) domain 616. The timestamper 604 is associated with a system clock domain 618. A portion of the transmission gearbox 608 and a portion of the serializer 610 are associated with a TX physical medium attachment sublayer (PMA) domain 620. A portion of the serializer 610 and the transmitter 612 are associated with a transmission clock domain 622. It should be appreciated that the TX PMA domain 620 is associated with a clock frequency that is lower than the transmission clock 614 by a factor of the bus size of the TX PMA domain 620, which is 40 bits in the illustrative embodiment. Similarly, the TX PCS domain 616 is associated with a clock frequency that is lower than the transmission clock 614 by a factor of the bus size of the PCS domain 616, which is 66 bits in the illustrative embodiment. It should be appreciated that the each of the TX PCS domain 616 and the TX PMA domain 620 is locked to the transmission clock domain 622, while the system clock domain 618 is free-running relative to each of the TX PCS domain 616, the TX PMA domain 620, and the transmission clock domain 622.

When receiving data, data is first received by the receiver 624. The signal received by the receiver 624 is used to recover a clock by the receiver clock 626. The data is deserialized by a deserializer 628. The data is then transferred from a first bus to a second bus using a receiving gearbox 630. The data is decoded using a decoder 632, which may decode the data by descrambling it and/or applying other decoding such as forward error correction decoding. The data checked by a packet detector 634 for a trigger pattern, such as a start of frame delimiter. If the trigger pattern is found, a timestamper 636 is triggered.

The various elements used in receiving the data are synchronized based on the receiver clock 626. However, the various components are associated with different clock domains. A portion of the deserializer 628 and the receiver 624 are associated with a receiver clock domain 638. A portion of the receiving gearbox 630 and a portion of the deserializer 628 are associated with a receiving (RX) PMA domain 640. The packet detector 634, decoder 632, and a portion of the receiving gearbox 630 are associated with a RX PCS domain 642. The timestamper 636 is associated with a system clock domain 618. It should be appreciated that the each of the RX PCS domain 642 and the RX PMA domain 640 is locked to the receiver clock domain 638, while the system clock domain 618 is free-running relative to each of the RX PCS domain 642, the RX PMA domain 640, and the receiver clock domain 638.

Figure 7:
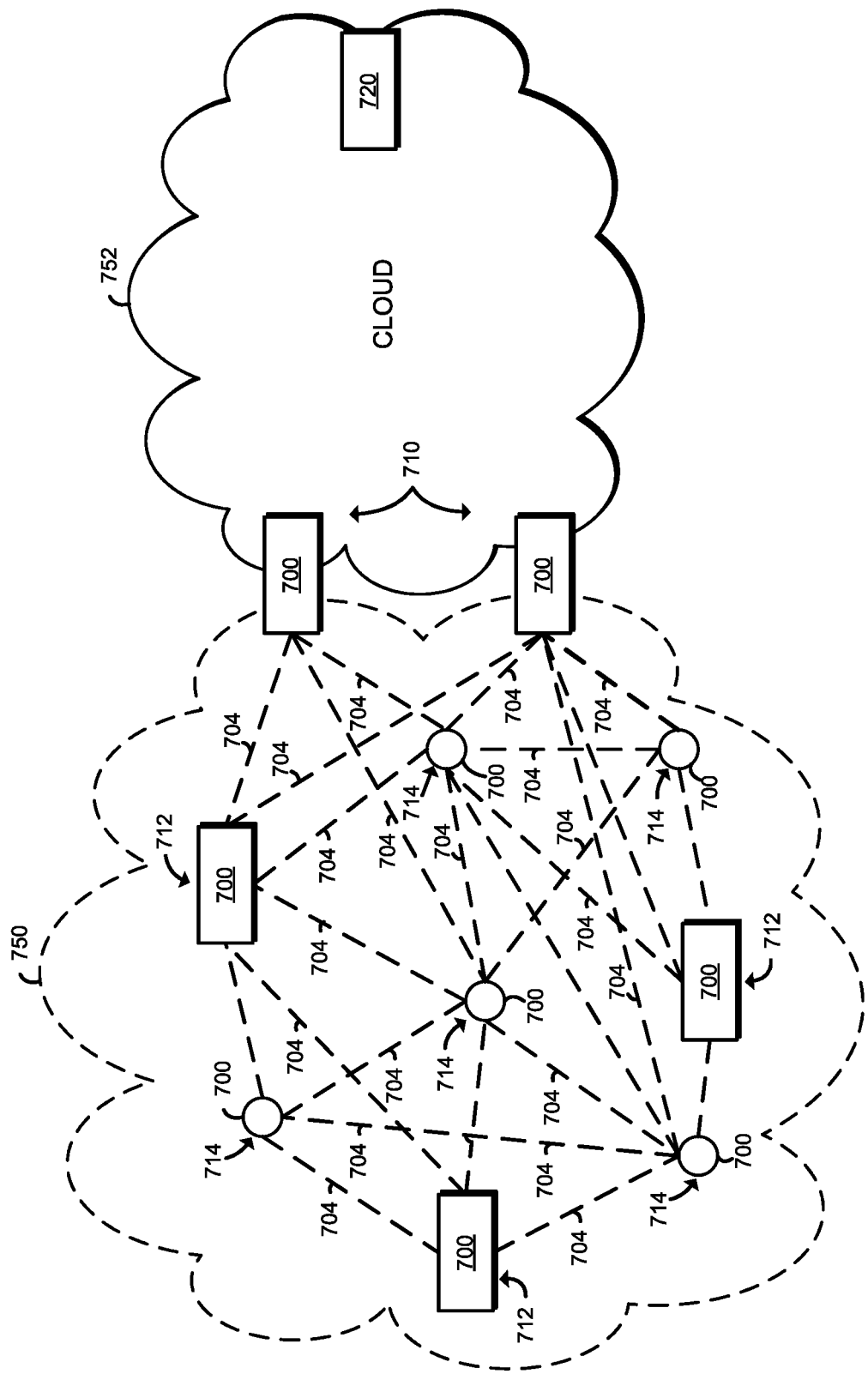
FIG. 7 is a simplified block diagram of another embodiment of a system having compute devices similar to that in FIG. 1 arranged in a mesh network.

Referring now to FIG. 7, in some embodiments, one or more compute devices 100 may be embodied as Internet-of-Things devices 700 and form, potentially with other devices, a mesh network, which may be termed as a fog 750, operating at the edge of a cloud network 752. The fog 750 may be considered to be a massively interconnected network wherein a number of IoT devices 700 are in communications with each other, for example, by radio links 704 (all of which are not labeled in FIG. 7 to simplify the figure and for clarify). This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 700 are shown in the example embodiment of FIG. 7, gateways 710, data aggregators 712, and sensors 714, although any combinations of IoT devices 700 and functionality may be used. The gateways 710 may be edge devices that provide communications between the cloud 752 and the fog 750, and may also provide the backend process function for data obtained from sensors 714. The data aggregators 712 may collect data from any number of the sensors 714, and perform the back end processing function for the analysis. The results, raw data, or both may be passed along to the cloud 752 through the gateways 710. The sensors 714 may be full IoT devices 700, for example, capable of both collecting data and processing the data. In some cases, the sensors 714 may be more limited in functionality, for example, collecting the data and allowing the data aggregators 712 or gateways 710 to process the data.

Communications from any IoT device 700 may be passed along the most convenient path between any of the IoT devices 700 to reach the gateways 710. In these networks, the number of interconnections provide substantial redundancy, allowing communications to be maintained, even with the loss of a number of IoT devices 700. Further, the use of a mesh network may allow IoT devices 700 that are very low power or located at a distance from infrastructure to be used, as the range to connect to another IoT device 700 may be much less than the range to connect to the gateways 710. The fog 750 of the IoT devices 700 devices may be presented to devices in the cloud 752, such as a server 720, as a single device located at the edge of the cloud 752, e.g., a fog 750 device.

EXAMPLES

Illustrative examples of the devices, systems, and methods disclosed herein are provided below. An embodiment of the devices, systems, and methods may include any one or more, and any combination of, the examples described below.

Example 1 includes a compute device for timestamping arrival of data, the compute device comprising network interface card; and a delay determiner to determine a phase difference between a system clock of the compute device and a clock of the network interface card of the compute device, wherein the network interface card is to (i) detect a trigger pattern in data received over a physical medium and (ii) trigger a timestamp in response to detection of the trigger pattern, wherein the delay determiner is further to determine an indication of a timing of arrival of the data based on the timestamp and the phase difference between the system clock and the clock of the network interface card.

Example 2 includes the subject matter of Example 1, and wherein the trigger pattern is a start of frame delimiter, wherein to determine the indication of the timing of arrival of the data based on the timestamp and the phase difference between the system clock and the clock of the network interface card comprises to determine an indication of a timing of arrival of the start of frame delimiter based on the timestamp and the phase difference between the system clock and the clock of the network interface card.

Example 3 includes the subject matter of any of Examples 1 and 2, and wherein the trigger pattern is a start of a data packet, wherein to determine the indication of the timing of arrival of the data based on the timestamp and the phase difference between the system clock and the clock of the network interface card comprises to determine an indication of a timing of arrival of the start of the data packet based on the timestamp and the phase difference between the system clock and the clock of the network interface card.

Example 4 includes the subject matter of any of Examples 1-3, and wherein to determine the phase difference between the system clock and the clock of the network interface card comprises to determine a time-dependent phase difference between the system clock and the clock of the network interface card; and determine the phase difference between the system clock and the clock of the network interface card based on the time-dependent phase difference and the timestamp.

Example 5 includes the subject matter of any of Examples 1-4, and wherein to determine the time-dependent phase difference between the system clock and the clock of the network interface card comprises to compare an estimated time based on the system clock and an estimated time based on the clock of the network interface card.

Example 6 includes the subject matter of any of Examples 1-5, and wherein to compare the estimated time based on the system clock and the estimated time based on the clock of the network interface card comprises to determine, for each of a plurality of clock cycles of the system clock, a plurality of estimated times based on the system clock and a plurality of estimated times based on the clock of the network interface card; and compare each estimated time of the plurality of estimated times based on the system clock with each corresponding estimated time of the plurality of estimated times based on the clock of the network interface card, wherein to determine the time-dependent phase difference between the system clock and the clock of the network interface card comprises to determine the time-dependent phase difference between the system clock and the clock of the network interface card based on the comparisons between the plurality of estimated times based on the system clock and the plurality of estimated times based on the clock of the network interface card.

Example 7 includes the subject matter of any of Examples 1-6, and wherein the delay determiner is further to determine a phase difference between a physical coding sublayer clock of the network interface card and a physical medium attachment sublayer of the network interface card, wherein to determine the indication of the timing of arrival of the data based on the timestamp and the phase difference between the system clock and the clock of the network interface card comprises to determine the indication of the timing of arrival of the data based on the timestamp, the phase difference between the system clock and the clock of the network interface card, and the phase difference between the physical coding sublayer clock of the network interface card and the physical medium attachment sublayer of the network interface card.

Example 8 includes the subject matter of any of Examples 1-7, and wherein the delay determiner is further to determine a fixed latency of the network interface card, wherein to determine the indication of the timing of arrival of the data based on the timestamp and the phase difference between the system clock and the clock of the network interface card comprises to determine the indication of the timing of arrival of the data based on the timestamp, the phase difference between the system clock and the clock of the network interface card, and the fixed latency of the network interface card.

Example 9 includes the subject matter of any of Examples 1-8, and wherein the network interface card is further to descramble the data, wherein to detect the trigger pattern comprises to detect the trigger pattern after the data is descrambled.

Example 10 includes a compute device for timestamping sending of data, the method comprising a network interface card; and a delay determiner to determine a phase difference between a system clock of the compute device and a clock of the network interface card of the compute device, wherein the network interface card is to determine the data to be sent by the network interface card; detect a trigger pattern in the data; trigger a timestamp in response to detection of the trigger pattern; and send the data over a physical medium, wherein the delay determiner is further to determine an indication of a timing of the sending of the data based on the timestamp and the phase difference between the system clock and the clock of the network interface card.

Example 11 includes the subject matter of Example 10, and wherein the trigger pattern is a start of frame delimiter, wherein to determine the indication of the timing of the sending of the data based on the timestamp and the phase difference between the system clock and the clock of the network interface card comprises to determine an indication of a timing of the sending of the start of frame delimiter based on the timestamp and the phase difference between the system clock and the clock of the network interface card.

Example 12 includes the subject matter of any of Examples 10 and 11, and wherein the trigger pattern is a start of a data packet, wherein to determine the indication of the timing of the sending of the data based on the timestamp and the phase difference between the system clock and the clock of the network interface card comprises to determine an indication of a timing of the sending of the start of the data packet based on the timestamp and the phase difference between the system clock and the clock of the network interface card.

Example 13 includes the subject matter of any of Examples 10-12, and wherein to determine the phase difference between the system clock and the clock of the network interface card comprises to determine a time-dependent phase difference between the system clock and the clock of the network interface card; and determine the phase difference between the system clock and the clock of the network interface card based on the time-dependent phase difference and the timestamp.

Example 14 includes the subject matter of any of Examples 10-13, and wherein to determine the time-dependent phase difference between the system clock and the clock of the network interface card comprises to compare an estimated time based on the system clock and an estimated time based on the clock of the network interface card.

Example 15 includes the subject matter of any of Examples 10-14, and wherein to compare the estimated time based on the system clock and the estimated time based on the clock of the network interface card comprises to determine, for each of a plurality of clock cycles of the system clock, a plurality of estimated times based on the system clock and a plurality of estimated times based on the clock of the network interface card; and compare each estimated time of the plurality of estimated times based on the system clock with each corresponding estimated time of the plurality of estimated times based on the clock of the network interface card, wherein to determine the time-dependent phase difference between the system clock and the clock of the network interface card comprises to determine the time-dependent phase difference between the system clock and the clock of the network interface card based on the comparisons between the plurality of estimated times based on the system clock and the plurality of estimated times based on the clock of the network interface card.

Example 16 includes the subject matter of any of Examples 10-15, and wherein the delay determiner is further to determine a phase difference between a physical coding sublayer clock of the network interface card and a physical medium attachment sublayer of the network interface card, wherein to determine the indication of the timing of the sending of the data based on the timestamp and the phase difference between the system clock and the clock of the network interface card comprises to determine the indication of the timing of the sending of the data based on the timestamp, the phase difference between the system clock and the clock of the network interface card, and the phase difference between the physical coding sublayer clock of the network interface card and the physical medium attachment sublayer of the network interface card.

Example 17 includes the subject matter of any of Examples 10-16, and wherein the delay determiner is further to determine a fixed latency of the network interface card, wherein to determine the indication of the timing of the sending of the data based on the timestamp and the phase difference between the system clock and the clock of the network interface card comprises to determine the indication of the timing of the sending of the data based on the timestamp, the phase difference between the system clock and the clock of the network interface card, and the fixed latency of the network interface card.

Example 18 includes the subject matter of any of Examples 10-17, and wherein the network interface card is further to scramble the data, wherein to detect, by the network interface card, the trigger pattern comprises to detect, by the network interface card, the trigger pattern before the data is descrambled.

Example 19 includes a method for timestamping arrival of data by a compute device, the method comprising determining, by the compute device, a phase difference between a system clock of the compute device and a clock of a network interface card of the compute device; detecting, by the network interface card, a trigger pattern in data received over a physical medium; triggering, by the compute device, a timestamp in response to detection of the trigger pattern; and determining, by the compute device, an indication of a timing of arrival of the data based on the timestamp and the phase difference between the system clock and the clock of the network interface card.

Example 20 includes the subject matter of Example 19, and wherein the trigger pattern is a start of frame delimiter, wherein determining, by the compute device, the indication of the timing of arrival of the data based on the timestamp and the phase difference between the system clock and the clock of the network interface card comprises determining, by the compute device, an indication of a timing of arrival of the start of frame delimiter based on the timestamp and the phase difference between the system clock and the clock of the network interface card.

Example 21 includes the subject matter of any of Examples 19 and 20, and wherein the trigger pattern is a start of a data packet, wherein determining, by the compute device, the indication of the timing of arrival of the data based on the timestamp and the phase difference between the system clock and the clock of the network interface card comprises determining, by the compute device, an indication of a timing of arrival of the start of the data packet based on the timestamp and the phase difference between the system clock and the clock of the network interface card.

Example 22 includes the subject matter of any of Examples 19-21, and wherein to determine the phase difference between the system clock and the clock of the network interface card comprises to determine a time-dependent phase difference between the system clock and the clock of the network interface card; and determine the phase difference between the system clock and the clock of the network interface card based on the time-dependent phase difference and the timestamp.

Example 23 includes the subject matter of any of Examples 19-22, and wherein to determine the time-dependent phase difference between the system clock and the clock of the network interface card comprises to compare an estimated time based on the system clock and an estimated time based on the clock of the network interface card.

Example 24 includes the subject matter of any of Examples 19-23, and wherein to compare the estimated time based on the system clock and the estimated time based on the clock of the network interface card comprises to determine, for each of a plurality of clock cycles of the system clock, a plurality of estimated times based on the system clock and a plurality of estimated times based on the clock of the network interface card; and compare each estimated time of the plurality of estimated times based on the system clock with each corresponding estimated time of the plurality of estimated times based on the clock of the network interface card, wherein to determine the time-dependent phase difference between the system clock and the clock of the network interface card comprises to determine the time-dependent phase difference between the system clock and the clock of the network interface card based on the comparisons between the plurality of estimated times based on the system clock and the plurality of estimated times based on the clock of the network interface card.

Example 25 includes the subject matter of any of Examples 19-24, and further including determining a phase difference between a physical coding sublayer clock of the network interface card and a physical medium attachment sublayer of the network interface card, wherein determining, by the compute device, the indication of the timing of arrival of the data based on the timestamp and the phase difference between the system clock and the clock of the network interface card comprises determining, by the compute device, the indication of the timing of arrival of the data based on the timestamp, the phase difference between the system clock and the clock of the network interface card, and the phase difference between the physical coding sublayer clock of the network interface card and the physical medium attachment sublayer of the network interface card.

Example 26 includes the subject matter of any of Examples 19-25, and further including determining a fixed latency of the network interface card, wherein determining, by the compute device, the indication of the timing of arrival of the data based on the timestamp and the phase difference between the system clock and the clock of the network interface card comprises determining, by the compute device, the indication of the timing of arrival of the data based on the timestamp, the phase difference between the system clock and the clock of the network interface card, and the fixed latency of the network interface card.

Example 27 includes the subject matter of any of Examples 19-26, and further including descrambling the data, wherein detecting, by the network interface card, the trigger pattern comprises detecting, by the network interface card, the trigger pattern after descrambling the data.

Example 28 includes a method for timestamping sending of data by a compute device, the method comprising determining, by the compute device, a phase difference between a system clock of the compute device and a clock of a network interface card of the compute device; determining, by the compute device, the data to be sent by the network interface card; detecting, by the network interface card, a trigger pattern in the data; triggering, by the compute device, a timestamp in response to detection of the trigger pattern; sending, by the network interface card, the data over a physical medium; and determining, by the compute device, an indication of a timing of the sending of the data based on the timestamp and the phase difference between the system clock and the clock of the network interface card.

Example 29 includes the subject matter of Example 28, and wherein the trigger pattern is a start of frame delimiter, wherein determining, by the compute device, the indication of the timing of the sending of the data based on the timestamp and the phase difference between the system clock and the clock of the network interface card comprises determining, by the compute device, an indication of a timing of the sending of the start of frame delimiter based on the timestamp and the phase difference between the system clock and the clock of the network interface card.

Example 30 includes the subject matter of any of Examples 28 and 29, and wherein the trigger pattern is a start of a data packet, wherein determining, by the compute device, the indication of the timing of the sending of the data based on the timestamp and the phase difference between the system clock and the clock of the network interface card comprises determining, by the compute device, an indication of a timing of the sending of the start of the data packet based on the timestamp and the phase difference between the system clock and the clock of the network interface card.

Example 31 includes the subject matter of any of Examples 28-30, and wherein to determine the phase difference between the system clock and the clock of the network interface card comprises to determine a time-dependent phase difference between the system clock and the clock of the network interface card; and determine the phase difference between the system clock and the clock of the network interface card based on the time-dependent phase difference and the timestamp.

Example 32 includes the subject matter of any of Examples 28-31, and wherein to determine the time-dependent phase difference between the system clock and the clock of the network interface card comprises to compare an estimated time based on the system clock and an estimated time based on the clock of the network interface card.

Example 33 includes the subject matter of any of Examples 28-32, and wherein to compare the estimated time based on the system clock and the estimated time based on the clock of the network interface card comprises to determine, for each of a plurality of clock cycles of the system clock, a plurality of estimated times based on the system clock and a plurality of estimated times based on the clock of the network interface card; and compare each estimated time of the plurality of estimated times based on the system clock with each corresponding estimated time of the plurality of estimated times based on the clock of the network interface card, wherein to determine the time-dependent phase difference between the system clock and the clock of the network interface card comprises to determine the time-dependent phase difference between the system clock and the clock of the network interface card based on the comparisons between the plurality of estimated times based on the system clock and the plurality of estimated times based on the clock of the network interface card.

Example 34 includes the subject matter of any of Examples 28-33, and further including determining a phase difference between a physical coding sublayer clock of the network interface card and a physical medium attachment sublayer of the network interface card, wherein determining, by the compute device, the indication of the timing of the sending of the data based on the timestamp and the phase difference between the system clock and the clock of the network interface card comprises determining, by the compute device, the indication of the timing of the sending of the data based on the timestamp, the phase difference between the system clock and the clock of the network interface card, and the phase difference between the physical coding sublayer clock of the network interface card and the physical medium attachment sublayer of the network interface card.

Example 35 includes the subject matter of any of Examples 28-34, and further including determining a fixed latency of the network interface card, wherein determining, by the compute device, the indication of the timing of the sending of the data based on the timestamp and the phase difference between the system clock and the clock of the network interface card comprises determining, by the compute device, the indication of the timing of the sending of the data based on the timestamp, the phase difference between the system clock and the clock of the network interface card, and the fixed latency of the network interface card.

Example 36 includes the subject matter of any of Examples 28-35, and further including scrambling the data, wherein detecting, by the network interface card, the trigger pattern comprises detecting, by the network interface card, the trigger pattern before scrambling the data.

Example 37 includes one or more computer-readable media comprising a plurality of instructions stored thereon that, when executed, causes a compute device to perform the method of any of Examples 19-36.

Example 38 includes a compute device comprising means to perform the method of any of Examples 19-36.

What is claimed is:

1. An apparatus for use in association with a data transmission clock signal, a data reception clock signal, and another clock signal, the apparatus comprising:
    time counter circuitry to generate time count data for use in association with receive data timestamping and send data timestamping, the receive data timestamping being associated with data reception that is based upon the data reception clock signal, the send data timestamping being associated with data transmission that is based upon the data transmission clock signal;
    latency determination circuitry for use in determining, at least in part, signal propagation-related latency data; and
    phase difference determining circuitry for use in determining, at least in part, phase difference data, the phase difference data being based upon phase of the another clock signal relative to at least one phase of the data transmission clock signal and/or the data reception clock signal;
    wherein:
        the signal propagation-related latency data and the phase difference data are for use in adjusting the time count data so as to compensate, at least in part, for at least one potential synchronization difference related to signal propagation latency and/or clock phase difference.

2. The apparatus of claim 1, wherein:
the phase difference data is based upon the phase of the another clock signal relative to phases of the data transmission clock signal and the data reception clock signal.

3. The apparatus of claim 2, wherein:
the receive data timestamping and the send data timestamping are associated with respective data received and to be transmitted via a network.

4. The apparatus of claim 3, wherein:
the apparatus is comprised, at least in part, in field programmable gate array (FPGA) circuitry, application specific integrated circuitry (ASIC), and/or system-on-a-chip (SoC) circuitry.

5. At least one non-transitory machine-readable storage medium storing instructions for being executed by at least one machine, the at least one machine being for use in association with a data transmission clock signal, a data reception clock signal, and another clock signal, the instructions, when executed, by the at least one machine resulting in the at least one machine being configured for performance of operations comprising:
generating, by time counter circuitry of the at least one machine, time count data for use in association with receive data timestamping and send data timestamping, the receive data timestamping being associated with data reception that is based upon the data reception clock signal, the send data timestamping being associated with data transmission that is based upon the data transmission clock signal;
determining, at least in part, by latency determination circuitry of the at least one machine, signal propagation-related latency data; and
determining, at least in part, by phase difference determining circuitry of the at least one machine, phase difference data, the phase difference data being based upon phase of the another clock signal relative to at least one phase of the data transmission clock signal and/or the data reception clock signal;
wherein:
the signal propagation-related latency data and the phase difference data are for use in adjusting the time count data so as to compensate, at least in part, for at least one potential synchronization difference related to signal propagation latency and/or clock phase difference.

6. The at least one non-transitory machine-readable storage medium of claim 5, wherein:
the phase difference data is based upon the phase of the another clock signal relative to phases of the data transmission clock signal and the data reception clock signal.

7. The at least one non-transitory machine-readable storage medium of claim 6, wherein:
the receive data timestamping and the send data timestamping are associated with respective data received and to be transmitted via a network.

8. The at least one non-transitory machine-readable storage medium of claim 7, wherein:
the at least one machine is comprised, at least in part, in field programmable gate array (FPGA) circuitry, application specific integrated circuitry (ASIC), and/or system-on-a-chip (SoC) circuitry.

9. A method implemented using at least one machine, the at least one machine being for use in association with a data transmission clock signal, a data reception clock signal, and another clock signal, the method comprising:
generating, by time counter circuitry of the at least one machine, time count data for use in association with receive data timestamping and send data timestamping, the receive data timestamping being associated with data reception that is based upon the data reception clock signal, the send data timestamping being associated with data transmission that is based upon the data transmission clock signal;
determining, at least in part, by latency determination circuitry of the at least one machine, signal propagation-related latency data; and
determining, at least in part, by phase difference determining circuitry of the at least one machine, phase difference data, the phase difference data being based upon phase of the another clock signal relative to at least one phase of the data transmission clock signal and/or the data reception clock signal;
wherein:
the signal propagation-related latency data and the phase difference data are for use in adjusting the time count data so as to compensate, at least in part, for at least one potential synchronization difference related to signal propagation latency and/or clock phase difference.

10. The method of claim 9, wherein:
the phase difference data is based upon the phase of the another clock signal relative to phases of the data transmission clock signal and the data reception clock signal.

11. The method of claim 10, wherein:
the receive data timestamping and the send data timestamping are associated with respective data received and to be transmitted via a network.

12. The method of claim 11, wherein:
the at least one machine is comprised, at least in part, in field programmable gate array (FPGA) circuitry, application specific integrated circuitry (ASIC), and/or system-on-a-chip (SoC) circuitry.

13. A computer system for use in association with a data transmission clock signal, a data reception clock signal, and another clock signal, the computer comprising:
a multi-core processor;
solid-state data storage storing instructions for being executed by the multi-core processor; and
a network interface card circuitry comprising:
time counter circuitry to generate time count data for use in association with receive data timestamping and send data timestamping, the receive data timestamping being associated with data reception that is based upon the data reception clock signal, the send data timestamping being associated with data transmission that is based upon the data transmission clock signal;
latency determination circuitry for use in determining, at least in part, signal propagation-related latency data; and
phase difference determining circuitry for use in determining, at least in part, phase difference data, the phase difference data being based upon phase of the another clock signal relative to at least one phase of the data transmission clock signal and/or the data reception clock signal;
wherein:

the signal propagation-related latency data and the phase difference data are for use in adjusting the time count data so as to compensate, at least in part, for at least one potential synchronization difference related to signal propagation latency and/or clock phase difference.

14. The computer system of claim 13, wherein:
the phase difference data is based upon the phase of the another clock signal relative to phases of the data transmission clock signal and the data reception clock signal.

15. The computer system of claim 14, wherein:
the receive data timestamping and the send data timestamping are associated with respective data received and to be transmitted via a network.

16. The computer system of claim 15, wherein:
the network interface card circuitry is comprised, at least in part, in field programmable gate array (FPGA) circuitry, application specific integrated circuitry (ASIC), and/or system-on-a-chip (SoC) circuitry.

* * * * *